July 13, 1954  E. H. MUELLER  2,683,465
VALVE WITH POSITION INDICATING MEANS
Filed July 18, 1951  3 Sheets-Sheet 1
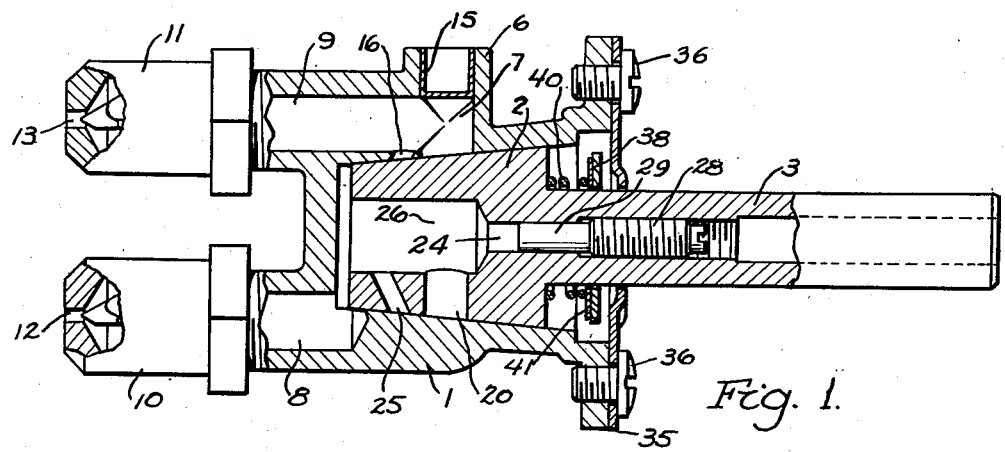
Fig. 1.
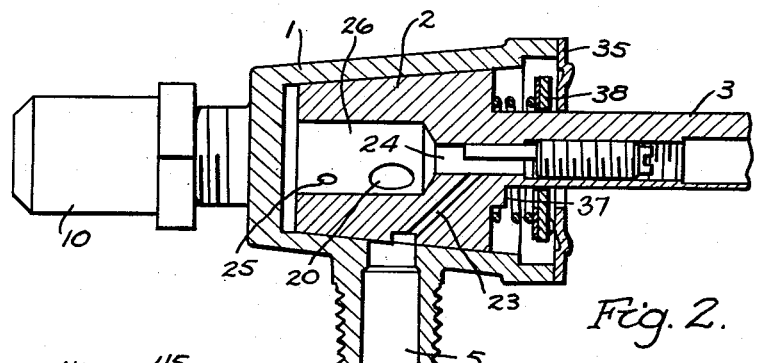
Fig. 2.
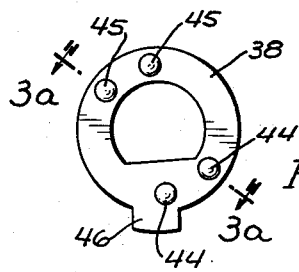
Fig. 3.
Fig. 3a.
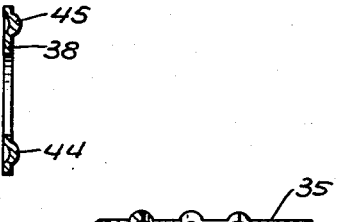
Fig. 5.
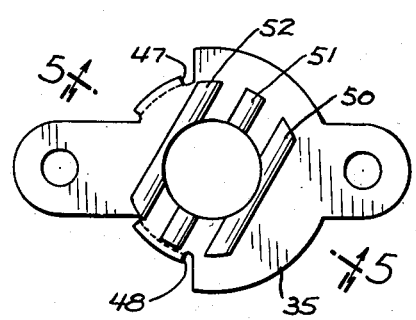
Fig. 4.
INVENTOR.
Ervin H. Mueller
BY
Barnes, Kisselle, Laughlin & Raisch
ATTORNEYS.

July 13, 1954 E. H. MUELLER 2,683,465
VALVE WITH POSITION INDICATING MEANS
Filed July 18, 1951 3 Sheets-Sheet 2

INVENTOR.
Ervin H. Mueller
BY
Barnes, Kisselle, Laughlin & Raisch
ATTORNEYS.

July 13, 1954     E. H. MUELLER     2,683,465
VALVE WITH POSITION INDICATING MEANS Filed July 18, 1951     3 Sheets-Sheet 3

INVENTOR.
Ervin H. Mueller
BY
Barnes, Kisselle, Laughlin & Raisch
ATTORNEYS.

Patented July 13, 1954

2,683,465

UNITED STATES PATENT OFFICE 2,683,465

VALVE WITH POSITION INDICATING MEANS

Ervin H. Mueller, Grosse Pointe, Mich.

Application July 18, 1951, Serial No. 237,423

3 Claims. (Cl. 137—625.32)

This invention relates to a valve for controlling the flow of a fluid and it is concerned particularly with a valve for controlling the flow of fuel gas to a gas burner.

The valve of the present invention has ported members so organized that different rates of flow of gas therethrough may be effected so that relatively high and relatively low flames may be provided at the burner.

More specifically, the valve may provide for a high flame in its full on position, a simmer flame which may be considered a flame of intermediate size and a low flame for use in keeping foods or liquids in a warm condition.

One object of the invention is to provide an improved means for giving an audible indication when the valve is in certain positions. To this end, two elements are provided which are relatively rotatable in the operation of the valve and one of which is acted upon by a spring. These two members have a novel construction of interengaging elements which snap into engagement and thereby give an audible indication when the valve is in one or more of its determined positions.

A valve constructed in accordance with the invention is shown in the accompanying drawings:

Fig. 1 is a view largely in cross section showing a double outlet valve constructed in accordance with the invention and illustrating some of the valve structure and porting.

Fig. 2 is a partial sectional view showing some of the parts and taken at right angles of Fig. 1.

Fig. 3 is a view of a washer element.

Fig. 3a is a sectional view of the washer element taken on line 3a—3a of Fig. 3.

Fig. 4 is a view showing a cap.

Fig. 5 is a cross sectional view of the cap taken on line 5—5 of Fig. 4.

Figure 6:
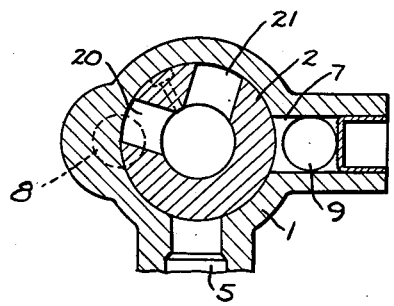
Fig. 6 is a cross sectional view taken transversely to the axis of the rotary member showing the valve in off position.

The double outlet valve, as shown in Figs. 1 and 2, has a body 1 with a tapered valve chamber for receiving a tapered valve member 2 provided with a hollow stem 3. The stem is designed to receive an operating handle. The body has a threaded extension which provides an inlet passage 5 and a lateral extension 6 which provides a port 7. There are two outlet passages 8 and 9 which extend into threaded extensions, each provided with the usual hood 10 and 11 each with an outlet orifice 12 and 13. This valve may be employed with a double burner, known to those versed in the art, which may have a small burner section to which fuel is passed from the orifice 12 and a larger burner section to which fuel is passed through the orifice 13.

The port 7 may be drilled into the body and it may be closed by a plug 15 and for purposes which will presently appear, the body may have another and supplemental port 16.

The valve member 2 has a port 20 and a port 21, as shown in Fig. 6, and between these ports is a small port 23, as shown in Fig. 2, which is angularly disposed and which communicates into the hollow portion 24 of the stem. The hollow portion 24 of the stem and the two ports 20 and 21 communicate into a central passage 26. As shown in Fig. 1, port 7 communicates into the side of the valve chamber while the passage 8 communicates into the end of the valve chamber beyond the end of the valve member. The valve member also has a supplemental port 25, the purpose of which will presently be seen, this port being adjacent to but offset axially from the port 20.

In the hollow stem, is a throttle member which has a body portion 28 screw threaded into the stem and a projecting throttling part 29 which is D-shaped in cross section. By turning this member on its screw threads, the D-shaped extension 29 may be caused to partially cover the port 23 to thus determine the gas which may flow therethrough. In adjusting this throttling member it will advance or retract on its threads but the D-shaped extension 29 is long enough to allow for considerable axial movement and still throttle the port 23.

In the off position, the ports are as shown in Fig. 6 where it will be noted that the inlet passage 5 is closed. If the valve member be turned counter-clockwise from the Fig. 6 position to the Fig. 8 position, it is in simmer position and gas flows through passage 20, through passage 26, through passage 8 and discharged from the orifice 12 thus supplying gas for the simmer section of the burner which is a relatively low flame. The amount of gas supplied is controlled by the orifice 12 which is adjusted in the usual manner by adjusting the hood 10 on its screw threads. In this position sufficient gas flows to the burner so that the gas may be readily ignited.

Figure 8:
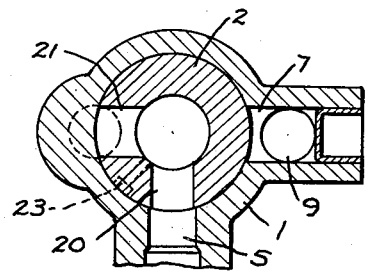
Fig. 8 is a view similar to Fig. 6 showing the valve in simmer position.
Figure 10:
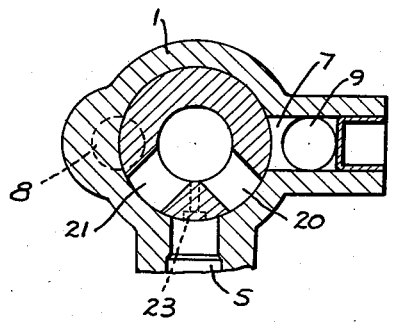
Fig. 10 is a cross sectional view similar to Fig. 6 showing the valve adjusted to low position.

If the valve be turned further counter-clockwise from the Fig. 8 position to the Fig. 10 position, the port 23 registers with the inlet passage 5, as shown in Fig. 2. A smaller supply of gas which may be controlled by the D-shaped member 29 now flows through the end 24 of the hollow stem, passage 26, passage 8, and thence through the orifice 12 to the simmer section of the burner. This is the low position.

Figure 12:
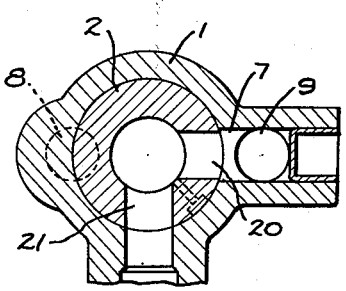
Fig. 12 is a cross sectional view similar to Fig. 6 showing the valve in full on position.

When the valve is turned further counter-clockwise from the Fig. 10 position, to the Fig. 12 position, the port 21 registers with the inlet passage 5 so that gas may now flow through both outlets. The gas enters through port 21 into passage 26 and thence into outlet passage 8 and also flows out through port 20 into the port 7 and thence outlet passage 9, through the orifice 13 to the large section of the burner.

At this point, the purpose of the ports 16 and 25 may be brought up. The port 20 is a little smaller than the port 21 in order to obtain sufficient sealing surface on the periphery of the plug between the port 20 and port 23, as well as the port 21 and the port 23. This surface is needed to provide a seal across the inlet port 5, as shown in Fig. 10, to prevent gas from flowing into the passage 26 of the plug in all places except through the passage 23. In order to insure adequate capacity for the large section of the burner, in the full on position, the ports 16 and 25 are provided and these register with each other in the Fig. 12 position with the result that gas passing to the outlet 9 may pass through the aligned ports 20 and 7 and the aligned ports 25 and 16.

There is a cap 35 which may be secured to the valve body by screws 36 and which has a central aperture through which the stem 3 extends. The stem is slabbed off on one side up to a shoulder 37 so that it is D-shaped in cross section and mounted on the stem to turn therewith is a washer 38 (Fig. 3). Between the washer and the body of the valve member is a coil spring 40 which holds the valve member on its seat and yieldably holds the washer against the cap. A small anti-friction washer 41 may be placed between the spring and the washer 38.

This washer is provided with four teats or projections arranged in pairs as at 44 and 45 which face towards the cap, these being advantageously formed by displacing or pressing the metal of the washer, as shown in Fig. 3a, and the washer has a projecting finger 46. The cap has a down-turned lug 47 (Fig. 5) and a down-turned lug 48 and these lugs serve as limit stops for the finger 46. The cap is provided with transversely extending trough like grooves or depressions 50, 51 and 52. These depressions extend substantially parallel with each other as indicated and their spacing corresponds to the spacing of the teats 44 and 45. One depression 51 is divided because of the central aperture in the cap and the central aperture cuts into the depressions 50 and 52.

Figure 7:
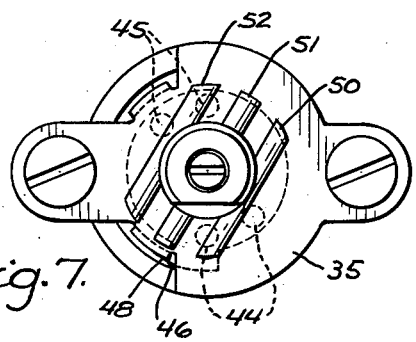
Fig. 7 is an end view illustrating the cap and showing the washer and corresponding to the position shown in Fig. 6.
Figure 13:
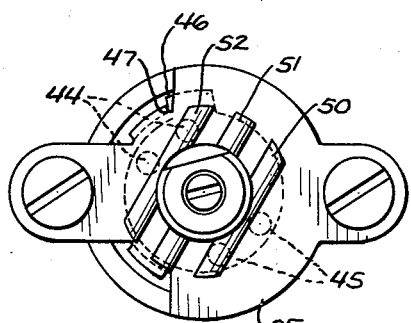
Fig. 13 is a view of the cap and illustrating the washer in a position corresponding to Fig. 12.

When the valve is in the off position, as shown in Fig. 6, the projection 46 abuts the limit stop 48, as shown in Fig. 7. As indicated by the dotted lines in Fig. 7, the teats on the washer are not in alignment with the depressions and, therefore, the washer is held spaced from the cap as shown in Fig. 1. When the valve is turned to the Fig. 8 position, the teats 44 snap into the depressions 50 and 51 and simultaneously the teats 45 snap into the depressions 51 and 52. Thus the entire washer is quickly urged axially and the impact against the cap results in an audible click. When the washer is turned further counter-clockwise, to the Fig. 10 position, the teats are first urged out of the recesses and when the valve member reaches the Fig. 10 position, the teats 44 snap into recesses 51 and 52 and the teats 45 snap into recesses 50 and 51. Further counter-clockwise movement causes the finger 46 to abut the limit stop 47, as shown in Fig. 13, and the valve is full on.

Figure 9:
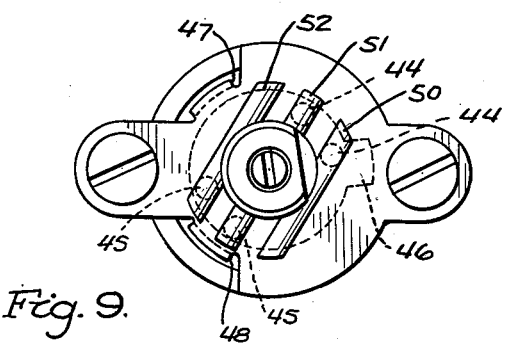
Fig. 9 is a view similar to Fig. 7 but illustrating the parts in a position corresponding to Fig. 8.
Figure 11:
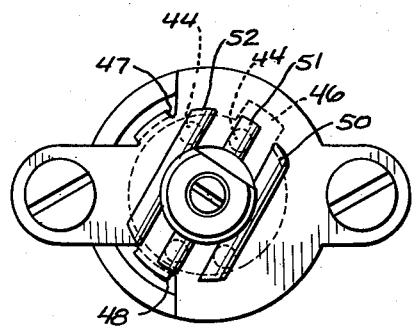
Fig. 11 is a view similar to Fig. 7 and corresponding to the low position of Fig. 10.

With this arrangement, the washer 38 shifts bodily toward and away from the cap and the washer is sufficiently loose on the D-shaped part of the stem as to permit it to slightly rotate when the teats snap into the recesses or troughs. In any other position of the washer relative to the cap, that is, other than the positions shown in Figs. 9 and 11, one or more of the teats ride on the inner face of the cap and therefore a single teat may pass freely over a recess without entering the same. For example, in Figs. 7 and 13, at least two of the teats are fully engaged at their crests with the interior face of the cap.

I claim:

1. In a valve for controlling the flow of fuel gas to a burner wherein a valve body and a valve member turnable relative to the body have passages and ports arranged to be brought into registry in different relative positions of the valve body and valve member for effecting different flow capacities through the valve; a first member rotatable with the valve member, a second member secured to the valve body, the members being shiftable toward and away from each other, spring means normally urging the members together, one member having four projections extending toward the other member, the other member having three transversely extending parallel grooves therein, said projections being arranged in pairs and the projections and grooves being so spaced that, in one relative position of the valve member and valve body, the pairs of projections engage in portions of the grooves, and in another relative position of the valve member and valve body the pairs of projections engage in other portions of the grooves, thereby indicating said relative positions of the valve member and valve body.

2. In a valve for controlling the flow of fuel gas to a burner wherein a valve body and a valve member turnable relative to the body have passages and ports arranged to be brought into registry in different relative positions of the valve body and valve member for effecting different flow capacities through the valve; a washer member mounted on the valve member to rotate therewith and being axially shiftable relative thereto, a cap member secured to the valve body, spring means for normally urging the washer member against the cap member, the washer member having four projections extending toward the cap member, the cap member having three transversely extending parallel grooves therein, said projections and said grooves being so spaced that, in one relative position of the valve member and valve body, the projections all engage in portions of said grooves under the action of the spring means, and in another relative position of the valve member and valve body, said projections all engage in other portions of said grooves under the action of said spring means, to thereby indicate said relative positions of the valve member and valve body.

3. In a valve for controlling the flow of fuel gas to a burner, wherein a valve body and a valve member turnable relative to the valve body have passages and ports arranged to be brought into registry in different relative positions of the valve member and valve body for effecting different flow capacities through the valve, an operating stem on the valve member, a cap secured to the valve body and having an aperture therein through which the operating stem extends; a washer non-rotatably mounted on the stem and slidable axially thereon, spring means for urging the washer against the cap, the washer having a plurality of projections extending toward the cap, the cap having a plurality of transversely extending parallel grooves with concavities facing toward the washer, said grooves having portions positioned substantially on opposite sides of the aperture in the cap, the projections and the grooves being so spaced relative to each other that, in one relative position of the valve member and valve body the projections engage in portions of said grooves under the action of the spring means, and in another relative position of the valve member and valve body, said projections engage in other portions of said grooves under the action of the spring means, to thereby indicate said relative positions of the valve member and valve body.

References Cited in the file of this patent

UNITED STATES PATENTS

| Number | Name | Date |
|---|---|---|
| 2,161,523 | Moecker | June 6, 1939 |
| 2,262,703 | Stuckenholt | Nov. 11, 1941 |
| 2,299,666 | Turner | Oct. 20, 1942 |
| 2,334,346 | Mueller | Nov. 16, 1943 |